No. 761,146. PATENTED MAY 31, 1904.
B. J. CARTER.
TRANSMISSION GEARING.
APPLICATION FILED SEPT. 21, 1903.
NO MODEL. 2 SHEETS—SHEET 1.

Witnesses
Palmer A. Jones
Georgiana Chace

Inventor
Byron J. Carter
By Luther V. Moulton
Attorney

No. 761,146. PATENTED MAY 31, 1904.
B. J. CARTER.
TRANSMISSION GEARING.
APPLICATION FILED SEPT. 21, 1903.
NO MODEL. 2 SHEETS—SHEET 2.
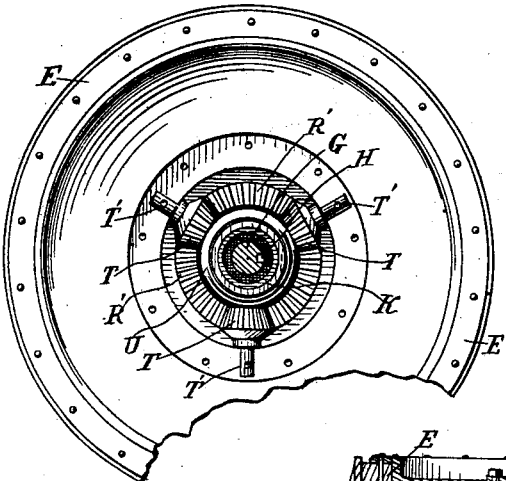
Fig. 4.
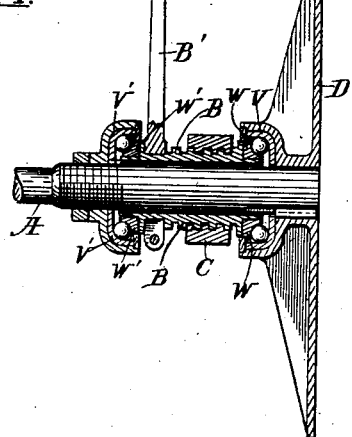
Fig. 3.
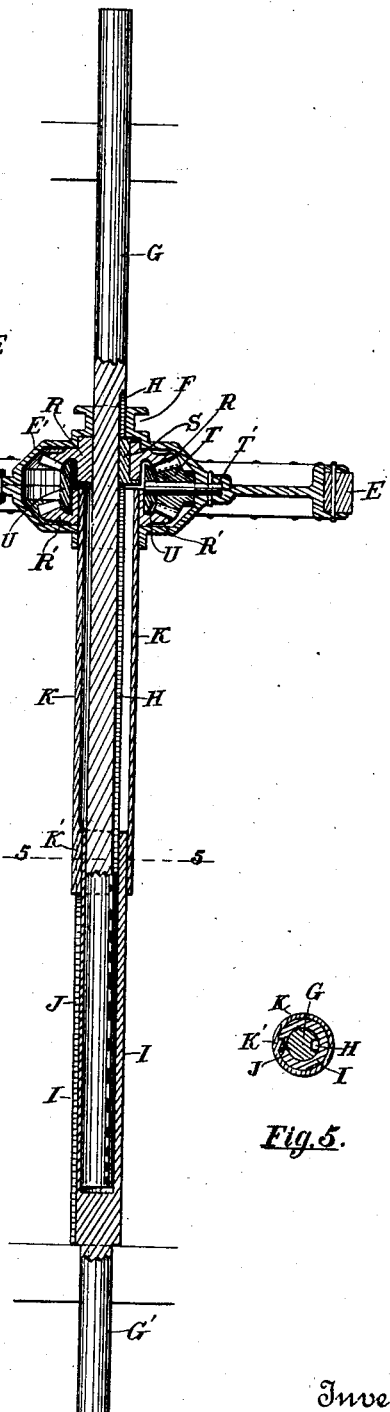
Fig. 5.
Fig. 6.
Witnesses
Palmer A. Jones
Georgiana Chace
Inventor
Byron J. Carter
By Luther V. Moulton
Attorney No. 761,146.

Patented May 31, 1904.

UNITED STATES PATENT OFFICE.

BYRON J. CARTER, OF JACKSON, MICHIGAN.

TRANSMISSION-GEARING.

SPECIFICATION forming part of Letters Patent No. 761,146, dated May 31, 1904.

Application filed September 21, 1903. Serial No. 173,968. (No model.)

*To all whom it may concern:*

Be it known that I, BYRON J. CARTER, a citizen of the United States, residing at Jackson, in the county of Jackson and State of Michigan, have invented certain new and useful Improvements in Transmission-Gearing; and I do hereby declare the following to be a full, clear, and exact description of the invention, such as will enable others skilled in the art to which it appertains to make and use the same.

My invention relates to improvements in transmission-gearing, and more particularly to such gearing for automobiles and like vehicles; and its object is to provide a cheap, compact, light, and durable device having a great range of speeds and easily and quickly detached from the motor or reversed; and it consists in the combination, construction, and arrangement of parts, as hereinafter more fully described, and particularly pointed out in the claims, reference being had to the accompanying drawings, in which—

Figure 1:
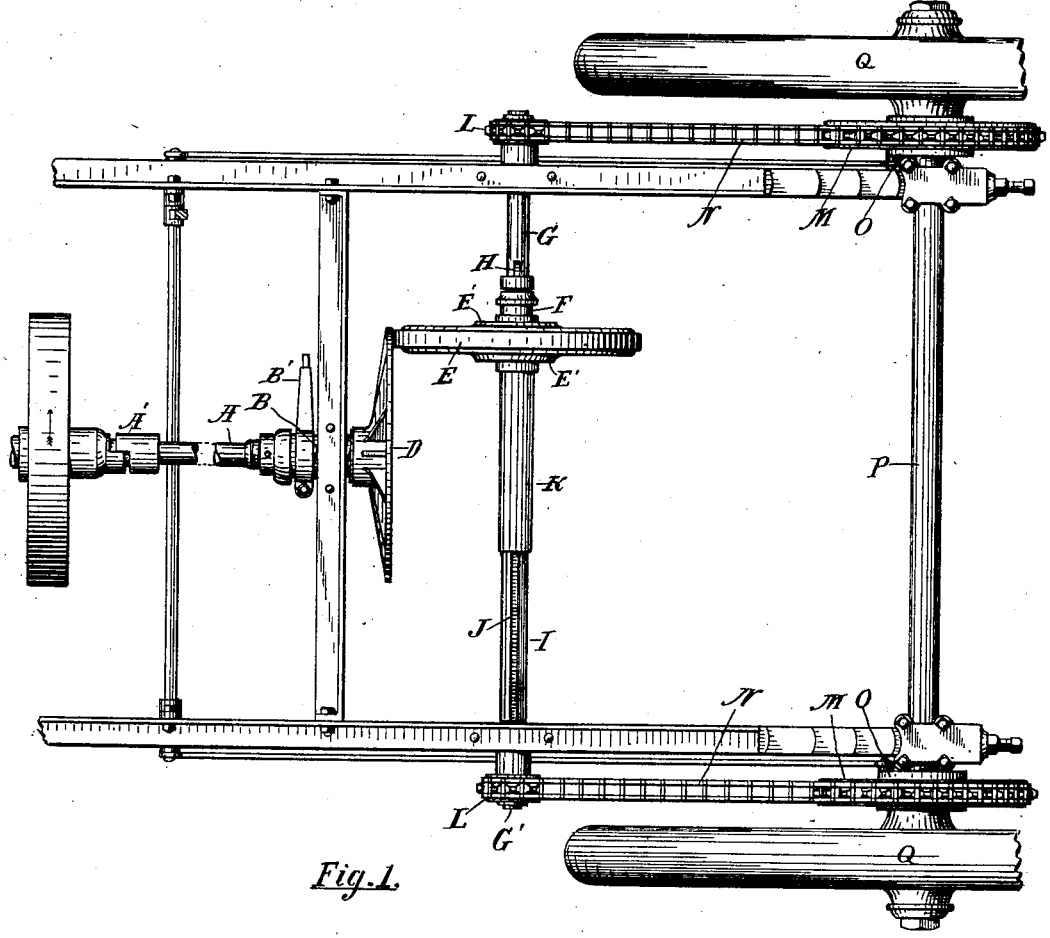
Figure 2:
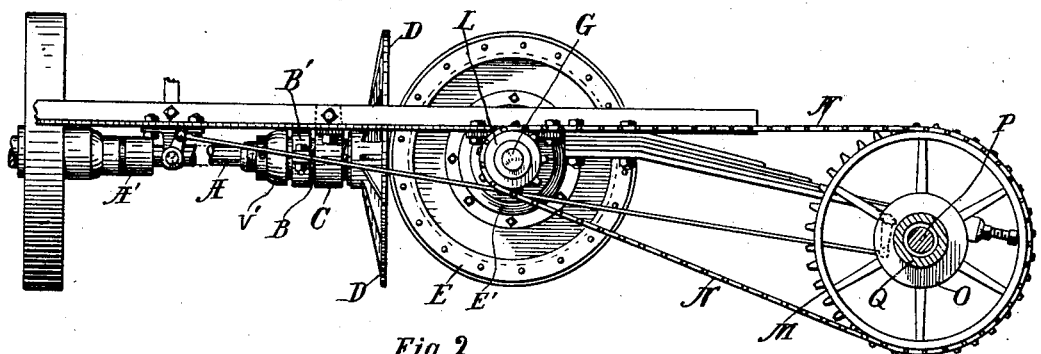

Figure 1 is a plan view of a device embodying my invention; Fig. 2, a side elevation of the same with the wheels Q omitted; Fig. 3, an enlarged detail in horizontal section; Fig. 4, a detail of the friction-wheel with one side of the gear-case removed; Fig. 5, a transverse section on the line 5 5 of Fig. 3, and Fig. 6 a detail of the sleeve B.

Like letters refer to like parts in all of the figures.

A represents the driving-shaft arranged longitudinally of the frame and connected to any convenient motor (preferably a constantly-running gasolene-motor) by means of a sliding coupling A' to permit of a limited longitudinal movement of the shaft A to engage and disengage the friction-disk D with a friction-wheel E, mounted on the transverse shaft G. To so move and hold the shaft A, said shaft is journaled in a sleeve B, mounted in a hanger C, attached to the frame and provided with internal screw-threads engaging similar threads on the sleeve, whereby when the sleeve is rotated it also moves longitudinally in the hanger C. To rotate and hold the sleeve, a suitable lever B' is attached thereto, which lever may be operated and held in any convenient manner. To provide antifriction journal and thrust bearings, the hub of the friction-disk D is provided with a ball-cup V, facing one end of the sleeve B, and on the shaft A and facing the other end of the said sleeve is a similar cup V', and on the respective ends of the sleeve are cones W and W', engaging balls in said cups. To take up wear or otherwise adjust these bearings, the cup V' is made adjustable on the shaft by means of screw-threads and a lock-nut, as shown in Fig. 3.

The rear wheels Q Q are independently rotative on the rear axle P, and each is provided with a large sprocket-wheel M and a friction-brake O, both being rigidly attached to the inner end of the hub, whereby the wheel is driven or retarded, as occasion requires. To drive the wheels separately and equally, a transverse shaft is provided, on which the friction-wheel E is mounted, and said shaft consists of two detached parts G and G', arranged in line and independently driven by the wheel E. To maintain alinement of the parts G and G' and connect the latter with the equalizer-gearing in the wheel E, the part G' is provided with a tubular extension I, within which the part G is inserted and rotative, and said extension is provided with a keyway J, engaged and traversed by a slidable key K', fixed in one end of a sleeve K, surrounding the shaft G and extension I and longitudinally movable thereon. On the other end of the sleeve K is fixed a bevel-gear R', and facing the same is a similar bevel-gear R, slidable on the shaft G and connected thereto by a key S, which engages and traverses a keyway H in said shaft. These gears thus separately drive the portions G and G' of the transverse shaft. These portions are separately connected to and drive the respective wheels Q Q by means of the small sprocket-wheels L L, the chains N N, and wheels M M.

The wheel E is provided with a hollow central portion E', which constitutes a hub and also forms a gear-case for the equalizer-gears and is also divided in the plane of the web and detachably connected by bolts, as shown in Fig. 3. One side of this case or hub is journaled on the sleeve K, and the other side of the same is journaled on the shaft G and provided with a suitable groove F, with which groove any suitable mechanism is engaged for adjusting the wheel E, the equalizer-gears, and the sleeve K longitudinally of the shaft G and radially of the disk D to adjust the speed or to reverse the motion, as occasion requires. To connect the wheel E and gears R and R' and equalize the power applied to each wheel, any convenient number of bevel-pinions T are inserted between said gears R and R' and oppositely engaging the same. These pinions are journaled on radial pins T', secured at their outer ends in recesses in the wheel E and supported at their inner ends by a ring U. These pinions are driven bodily around the axis of the wheel E by the said wheel and being freely rotative on the pins T' will act equally on each gear R and R' regardless of the relative speed of the same, and thus the power applied equally to each rear wheel at all times regardless of their relative rate of rotation. By adjusting the wheel E radially of the disk D the speed will be changed, and by moving the wheel E across the axis of the disk D the motion will be reversed.

I am aware that the described equalizing-gearing is not new. I do not claim such broadly; but I am not aware of any combination of equalizing-gearing and variable-speed friction-gearing as herein described.

Having thus fully described my invention, what I claim, and desire to secure by Letters Patent, is—

1. The combination of a friction-disk, a transversely-divided shaft, a friction-wheel engaging said disk and adjustable on said shaft, equalizing-gears also adjustably connected to the shaft, and means for simultaneously adjusting the wheel and the gears.

2. The combination of a friction-disk, means for adjusting the same in the direction of its axis, a divided shaft parallel to the surface of the disk, equalizing-gears connected to the respective portions of the shaft and longitudinally adjustable thereon, a friction-wheel engaged by the disk and connected to the equalizing-gears to operate the same and also longitudinally adjustable on the divided shaft.

3. The combination of a friction-disk, a divided shaft arranged parallel with the face of the disk, a tubular extension on one part of the shaft and inclosing the end of the other part of the same, a sleeve slidably connected to said extension, a bevel-gear mounted on the sleeve, an opposing bevel-gear slidably connected to the shaft, bevel-pinions connecting the bevel-gears, and a friction-wheel carrying the said pinions and longitudinally adjustable upon the shaft, and engaged by the friction-disk.

4. The combination of a shaft having a keyway and divided transversely near one end, a tubular extension having a keyway and attached to the short end of the shaft and inclosing a portion of the remainder of the shaft and rotative thereon, a sleeve slidably engaging said extension and having a key traversing the keyway, a bevel-gear fixed on the sleeve, a second bevel-gear, a key in the second bevel-gear and traversing the keyway of the shaft, a friction-wheel having a hollow hub inclosing said gears, bevel-pinions mounted in the wheel and connecting the bevel-gears, and a friction-disk engaging the friction-wheel.

5. The combination of a transversely-divided shaft, opposing bevel-gears slidably connected to the respective portions of the divided shaft, bevel-pinions connecting said gears, a friction-wheel journaled on said shaft and longitudinally movable on the same and supporting the pinions, and a friction-disk engaging the friction-wheel.

6. The combination of a longitudinally-adjustable driving-shaft, a friction-disk mounted thereon, a transversely-divided shaft arranged parallel with the face of the disk, equalizing-gears longitudinally movable on the shaft and respectively connected to the respective portions of the shaft to drive the same, a friction-wheel engaging the disk and longitudinally adjustable on the shaft, and having a hollow hub inclosing said gears, pinions within the hub and connecting the gears and radial pins supporting the pinions.

7. The combination of a motor-shaft, a longitudinally-movable driving-shaft, a friction-disk mounted thereon, a sliding coupling connecting said shafts, a friction-wheel driven by the disk, a longitudinally-movable sleeve in which the driving-shaft is journaled, and means for adjusting and holding the sleeve.

8. The combination of a motor-shaft, a driving-shaft, a sliding coupling connecting said shafts, a friction-disk mounted on the driving-shaft, a friction-wheel driven by the disk and radially adjustable relative thereto, a sleeve in which the shaft is journaled, said sleeve having external screw-threads, a hanger in which the sleeve is supported, said hanger being provided with internal screw-threads engaging the threads on the sleeve, and means for rotatively adjusting the sleeve.

9. The combination of a driving-shaft, a friction-disk mounted thereon, a friction-wheel driven by the disk and radially adjustable relative thereto, a sleeve surrounding the shaft and having external screw-threads, cones on the respective ends of the sleeve, a hanger supporting the sleeve and having internal screw-threads engaging the threads on the sleeve, means for rotating the sleeve in the hanger, a ball-cup and balls in the hub of the disk, and a ball-cup and balls adjustable on the shaft.

10. The combination of opposing bevel-gears, a divided shaft, means for slidably connecting the respective gears to the respective parts of the shaft, a wheel having a hollow hub inclosing said gears, pinions connecting the bevel-gears, radial pins supporting the pinions and supported at their outer ends by the hub and a ring surrounding the shaft and supporting the inner ends of the pins.

11. The combination of a divided shaft, bevel-gears slidably connected to the respective parts of the shaft, a friction-wheel having a hollow hub inclosing the gears, bevel-pinions in the hub, and connecting said gears, means for adjusting the gears and wheel longitudinally of the shaft, a friction-disk engaging the wheel, a longitudinally-adjustable shaft supporting the disk, means for adjusting the said shaft, a motor-shaft, and a sliding coupling connecting the motor-shaft and adjustable shaft.

In testimony whereof I affix my signature in presence of two witnesses.

BYRON J. CARTER.

Witnesses:
  P. B. WHITLOCK,
  W. E. SHELDEN.